United States Patent
Boutcher et al.

(10) Patent No.: US 7,130,982 B2
(45) Date of Patent: Oct. 31, 2006

(54) LOGICAL MEMORY TAGS FOR REDIRECTED DMA OPERATIONS

(75) Inventors: David Charles Boutcher, Rochester, MN (US); Colin Robert DeVilbiss, Rochester, MN (US); David Robert Engebretsen, Cannon Falls, MN (US)

(73) Assignee: International Business Machines Corporation, Armonk, NY (US)

( * ) Notice: Subject to any disclaimer, the term of this patent is extended or adjusted under 35 U.S.C. 154(b) by 316 days.

(21) Appl. No.: 10/815,234

(22) Filed: Mar. 31, 2004

(65) Prior Publication Data

US 2005/0223127 A1   Oct. 6, 2005

(51) Int. Cl.
*G06F 12/00* (2006.01)

(52) U.S. Cl. ..................................... 711/173
(58) Field of Classification Search .............. 711/202, 711/173; 710/22, 26, 40, 52, 308
See application file for complete search history.

(56) References Cited

U.S. PATENT DOCUMENTS

| | | | | |
|---|---|---|---|---|
| 4,901,234 | A | * | 2/1990 | Heath et al. .................. 710/40 |
| 5,301,287 | A | * | 4/1994 | Herrell et al. .............. 711/202 |
| 5,444,853 | A | * | 8/1995 | Lentz .......................... 710/52 |
| 5,649,230 | A | * | 7/1997 | Lentz .......................... 710/22 |
| 5,659,798 | A | * | 8/1997 | Blumrich et al. ............. 710/26 |
| 5,668,957 | A | * | 9/1997 | Davis et al. .................. 710/22 |
| 5,832,246 | A | * | 11/1998 | Matsumoto ................. 710/308 |
| 2004/0230861 | A1 | * | 11/2004 | Bailey et al. .................. 714/6 |
| 2005/0204366 | A1 | * | 9/2005 | Billau et al. ................ 719/324 |
| 2006/0155886 | A1 | * | 7/2006 | da Silva et al. ................ 710/5 |

OTHER PUBLICATIONS

IBM Technical Disclosure Bulletin, "Virtual Direct Memory Access", Mar. 1, 1996, NN960347.*

* cited by examiner

*Primary Examiner*—Pierre Bataille
*Assistant Examiner*—Paul Schlie
(74) *Attorney, Agent, or Firm*—Martin & Associates, LLC; Derek P. Martin

(57) ABSTRACT

A memory tag mechanism creates a logical memory tag of a first length that corresponds to an I/O address of a second length. The memory tag is "logical" because it does not represent physical memory. When an I/O adapter device driver that expects an address of the first length is invoked, the memory tag is passed. When the I/O adapter device driver makes a call to the partition manager to convert the address of the first length (i.e., memory tag) to an I/O address of the second length, the partition manager detects that the passed address is a memory tag instead of a real address, and returns the corresponding I/O address. In this manner existing device drivers that expect addresses of the first length may be used for redirected DMA, which allows performing DMA operations directly from a shared I/O adapter in a hosting partition to memory in a hosted partition.

16 Claims, 7 Drawing Sheets

LOGICAL MEMORY TAGS FOR REDIRECTED DMA OPERATIONS

BACKGROUND OF THE INVENTION

1. Technical Field

This invention generally relates to data processing, and more specifically relates to the sharing of resources between logical partitions in a logically partitioned computer system.

2. Background Art

Since the dawn of the computer age, computer systems have evolved into extremely sophisticated devices that may be found in many different settings. Computer systems typically include a combination of hardware (e.g., semiconductors, circuit boards, etc.) and software (e.g., computer programs). As advances in semiconductor processing and computer architecture push the performance of the computer hardware higher, more sophisticated computer software has evolved to take advantage of the higher performance of the hardware, resulting in computer systems today that are much more powerful than just a few years ago.

The combination of hardware and software on a particular computer system defines a computing environment. Different hardware platforms and different operating systems thus provide different computing environments. In recent years, engineers have recognized that it is possible to provide different computing environments on the same physical computer system by logically partitioning the computer system resources to different computing environments. The iSeries computer system developed by IBM is an example of a computer system that supports logical partitioning. If logical partitioning on an iSeries computer system is desired, partition manager code (referred to as a "hypervisor" in iSeries terminology) is installed that allows defining different computing environments on the same platform. Once the partition manager is installed, logical partitions may be created that define different computing environments. The partition manager manages the logical partitions to assure that they can share needed resources in the computer system while maintaining the separate computing environments defined by the logical partitions.

A computer system that includes multiple logical partitions typically shares resources between the logical partitions. For example, a computer system with a single CPU could have two logical partitions defined, with 50% of the CPU allocated to each logical partition, with 33% of the memory allocated to the first logical partition and 67% of the memory allocated to the second logical partition, and with two different I/O slots allocated to the two logical partitions, one per partition. Once logical partitions are defined and shared resources are allocated to the logical partitions, each logical partition acts as a separate computer system. Thus, in the example above that has a single computer system with two logical partitions, the two logical partitions will appear for all practical purposes to be two separate and distinct computer systems.

When logical partitions share a resource, such as an I/O adapter, one of the logical partitions is typically designated as the "owner" of the resource, and other logical partitions may share the resource by communicating with the logical partition that owns the resource. For the discussion herein, the term "hosting partition" refers to a logical partition that owns a resource, and the term "hosted partition" refers to a logical partition that does not own the resource but that desires to use (or share) the resource by communicating with the hosting partition. For example, when an application in a hosted partition needs to receive data from a shared network I/O adapter in the hosting partition (for example, a disk storage adapter), the application typically requests a read operation to the partition manager. A buffer is created in the hosting partition, and the request is forwarded to the I/O adapter device driver, which communicates the request to the I/O adapter. The I/O adapter then performs a direct memory access (DMA) transfer of the requested data to the buffer in the hosting partition. The partition manager then copies the data from the buffer in the hosting partition to a buffer in the hosted partition memory. The application in the hosted partition may then read the data from the buffer in its own memory.

The sharing of an I/O adapter between logical partitions as described above requires writing the data to the hosting partition memory, then copying that data to the hosted partition memory. Without a way for the I/O adapter to transfer data directly to the hosted partition memory, the sharing of virtual I/O adapters will suffer from penalties that slow system performance.

DISCLOSURE OF INVENTION

A memory tag mechanism creates a logical memory tag of a first length that corresponds to an I/O address of a second length. The memory tag is "logical" because it does not represent physical memory. When an I/O adapter device driver that expects an address of the first length is invoked, the memory tag is passed. When the I/O adapter device driver makes a call to the partition manager to convert the address of the first length (i.e., memory tag) to an I/O address of the second length, the partition manager detects that the passed address is a memory tag instead of a real address, and returns the corresponding I/O address. In this manner existing device drivers that expect addresses of the first length may be used for redirected DMA, which allows performing DMA operations directly from a shared I/O adapter in a hosting partition to memory in a hosted partition.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION

According to preferred embodiments of the present invention, a memory tag mechanism generates logical memory tags of a first length that correspond to an I/O address of a second length. This allows a memory tag to be passed to a device driver that expects an address of the first length. When the device driver passes the memory tag to the partition manager to determine the corresponding I/O address, the partition manager detects the memory tag, and returns the I/O address that corresponds to the memory tag. The memory tag mechanism allows using existing device drivers to support redirected DMA operations by creating a memory tag that corresponds to an I/O address in a different logical partition. The memory tag is passed to the device driver, which assumes the address is a valid memory address. When the device driver calls the partition manager to determine the corresponding I/O address, the partition manager detects the memory tag, and returns the I/O address corresponding to the memory tag. In this manner redirected DMA may be accomplished without any change to existing device drivers or I/O adapters.

Figure 1:
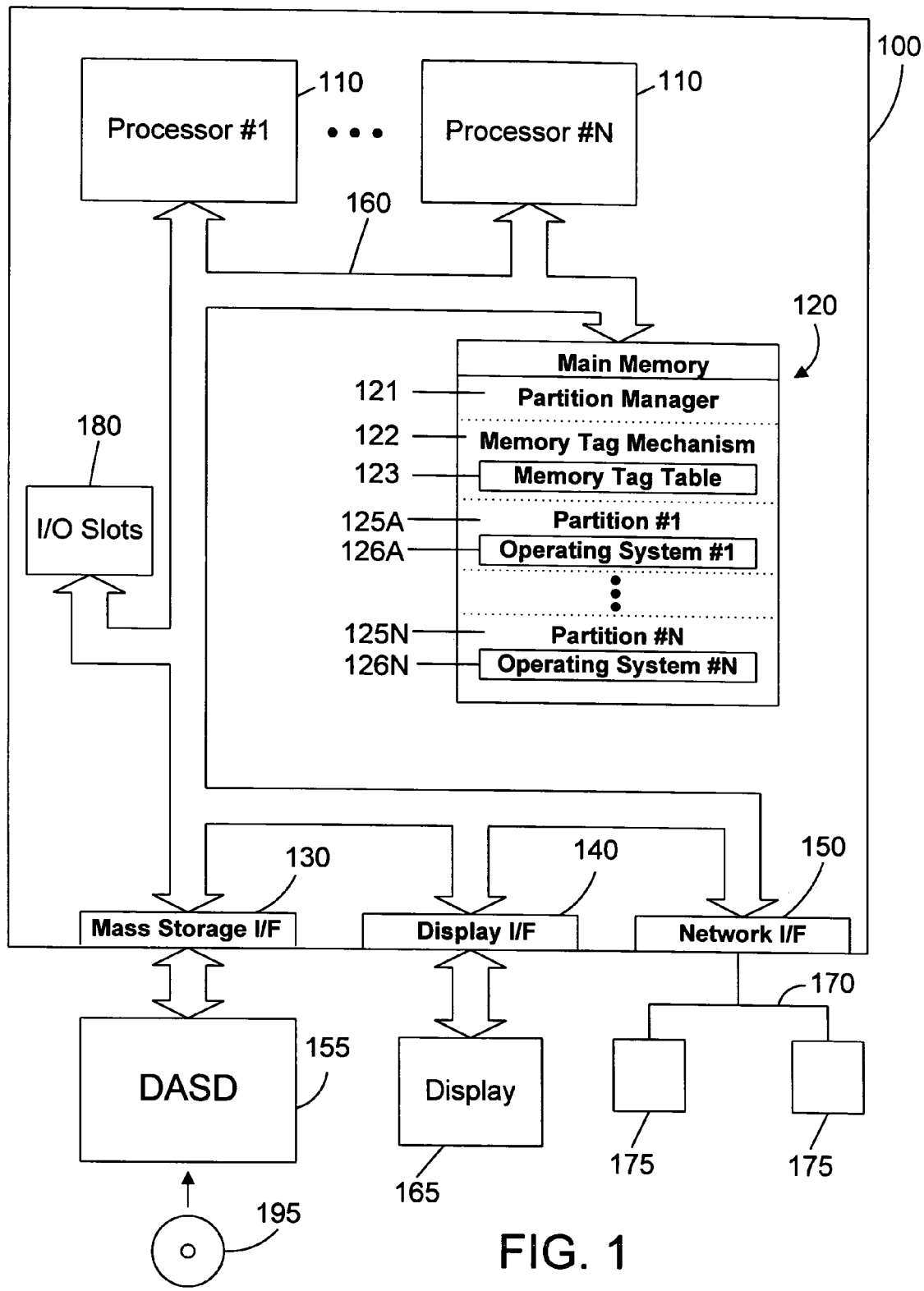
FIG. 1 is a block diagram of a computer apparatus that supports logical partitioning and use of memory tags in accordance with the preferred embodiments.

Referring to FIG. 1, a computer system 100 is an enhanced IBM eServer iSeries computer system, and represents one suitable type of computer system that supports logical partitioning and redirected DMA operations in accordance with the preferred embodiments. As shown in FIG. 1, computer system 100 comprises one or more processors 110 connected to a main memory 120, a mass storage interface 130, a display interface 140, a network interface 150, and a plurality of I/O slots 180. These system components are interconnected through the use of a system bus 160. Note that one or more of mass storage interface 130, display interface 140, and network interface 150 could be embedded I/O on computer system 100. Mass storage interface 130 is used to connect mass storage devices (such as a direct access storage device 155) to computer system 100. One specific type of direct access storage device is a CD RW drive, which may read data from a CD RW 195. Note that mass storage interface 130, display interface 140, and network interface 150 may actually be implemented in I/O adapters coupled to I/O slots 180. An I/O adapter is one suitable network interface 150 that may be implemented in an external card that is plugged into one of the I/O slots 180.

Main memory 120 contains a partition manager 121, a memory tag mechanism 122, and N logical partitions 125, shown in FIG. 1 as logical partitions 125A through 125N. Partition manager 121 preferably creates these N logical partitions 125. Each logical partition 125 preferably includes a corresponding operating system 126, shown in FIG. 1 as operating systems 126A through 126N.

The memory tag mechanism 122 generates a memory tag that does not represent physical memory, and is therefor a "logical" memory tag. The logical memory tag can be used as a proxy for a real address that accesses physical memory. The memory tag mechanism 122 preferably generates a memory tag of a first length when a corresponding address of a second length is known, but the device driver for a physical I/O device expects an address of the first length. The memory tag and its corresponding address of a second length are stored in a memory tag table 123. In essence, the memory tag mechanism 122 tricks the device driver by passing in a memory tag that looks like a valid address of the first length. When the device driver requests a corresponding address of the second length that corresponds to the memory tag, the partition manager detects that the address is a memory tag, the memory tag is looked up in the memory tag table 123, and the corresponding address of the second length is then returned to the device driver. This allows, for example, a redirected DMA operation to be performed when only a 32-bit I/O address is known, even when the device driver expects a 64-bit memory address, by assigning a 64-bit memory tag to the 32-bit I/O address, then passing the memory tag to the device driver. When the device driver requests from the partition manager a 32-bit I/O address that corresponds to the 64-bit memory tag, the partition manager recognizes the 64-bit address as a memory tag, and a simple table lookup on the memory tag table 123 is performed to return the 32-bit I/O address that corresponds to the 64-bit memory tag. Using the memory tag mechanism 122 of the preferred embodiments allows redirected DMA operations even when device driver expects a 64-bit address and only a 32-bit I/O address is available. Note that memory tag mechanism 122 could be implemented within the partition manager 121, or could be separate from the partition manager 121, as shown in FIG. 1.

Operating system 126 is a multitasking operating system, such as OS/400, AIX, or Linux; however, those skilled in the art will appreciate that the spirit and scope of the present invention is not limited to any one operating system. Any suitable operating system can be used. Operating system 126 is a sophisticated program that contains low-level code to manage the resources of computer system 100. Some of these resources are processor 110, main memory 120, mass storage interface 130, display interface 140, network interface 150, system bus 160, and I/O slots 180. The operating system 126 in each partition may be the same as the operating system in other partitions, or may be a completely different operating system. Thus, one partition can run the OS/400 operating system, while a different partition can run another instance of OS/400, possibly a different release, or with different environment settings (e.g., time zone or language). The operating systems in the logical partitions could even be different than OS/400, provided it is compatible with the hardware (such as AIX or Linux). In this manner the logical partitions can provide completely different computing environments on the same physical computer system.

The partitions 125A–125N are shown in FIG. 1 to reside within the main memory 120. However, one skilled in the art will recognize that a partition is a logical construct that includes resources other than memory. A logical partition typically specifies a portion of memory, along with an assignment of processor capacity and other system resources, such as I/O slots 180 (and I/O adapters, which may reside in I/O slots 180). Thus, one partition could be defined to include two processors and a portion of memory 120, along with one or more embedded I/O that can provide the functions of mass storage interface 130, display interface 140, network interface 150, or interfaces to I/O adapters or other devices plugged into I/O slots 180. Another partition could then be defined to include three other processors, a different portion of memory 120, one or more embedded I/O, and I/O slots 180. The partitions are shown in FIG. 1 to symbolically represent logical partitions, which would include system resources outside of memory 120 within computer system 100. Note also that the partition manager 121 preferably resides in memory and hardware separate from the logical partitions and includes facilities and mechanisms that are not directly available to the logical partitions.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while partition manager 121, memory tag mechanism 122, and the partitions 125A–125N are shown to reside in main memory 120, those skilled in the art will recognize that these items are not necessarily all completely contained in main memory 120 at the same time. It should also be noted that the term "memory" is used herein to generically refer to the entire virtual memory of computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up the partition manager 121, which initializes the operating systems in the logical partitions.

Although computer system 100 is shown to contain only a single system bus, those skilled in the art will appreciate that the present invention may be practiced using a computer system that has multiple buses. In addition, the I/O interfaces that are used in the preferred embodiment each may include separate, fully programmed microprocessors that are used to off-load compute-intensive processing from processor 110, as in series input/output processors, or may be simple industry standard I/O adapters (IOAs).

Display interface 140 is used to directly connect one or more displays 165 to computer system 100. These displays 165, which may be non-intelligent (i.e., dumb) terminals or fully programmable workstations, are used to allow system administrators and users to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of computer readable signal bearing media used to actually carry out the distribution. Examples of suitable signal bearing media include: recordable type media such as floppy disks and CD RW (e.g., 195 of FIG. 1), and transmission type media such as digital and analog communications links.

Figure 2:
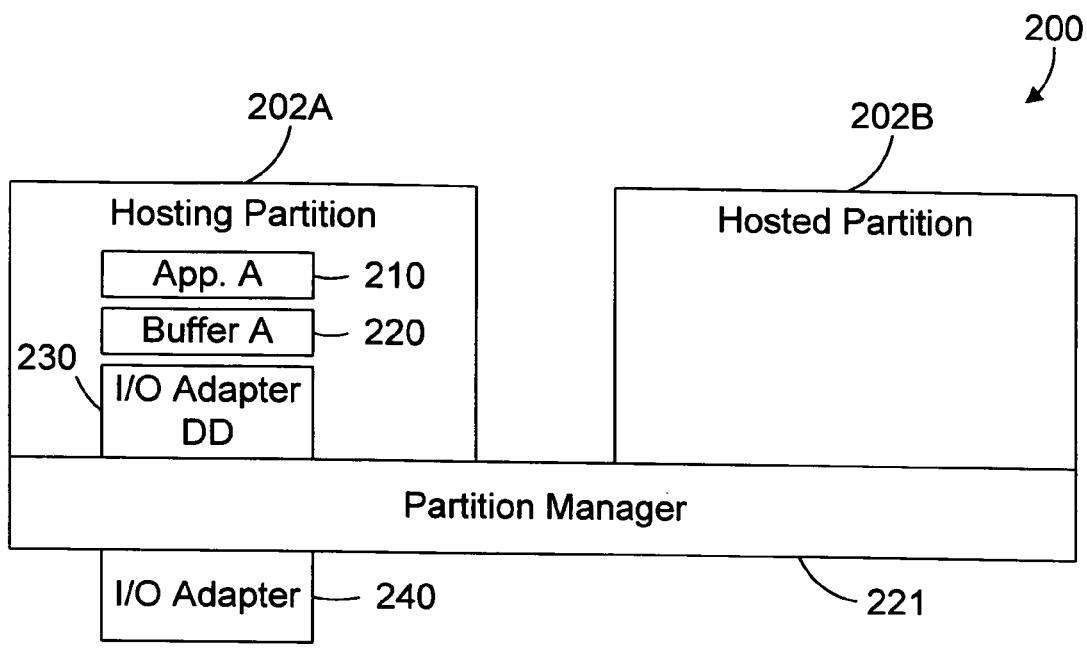
FIG. 2 is a block diagram of a prior art logically partitioned computer system.
Figure 3:
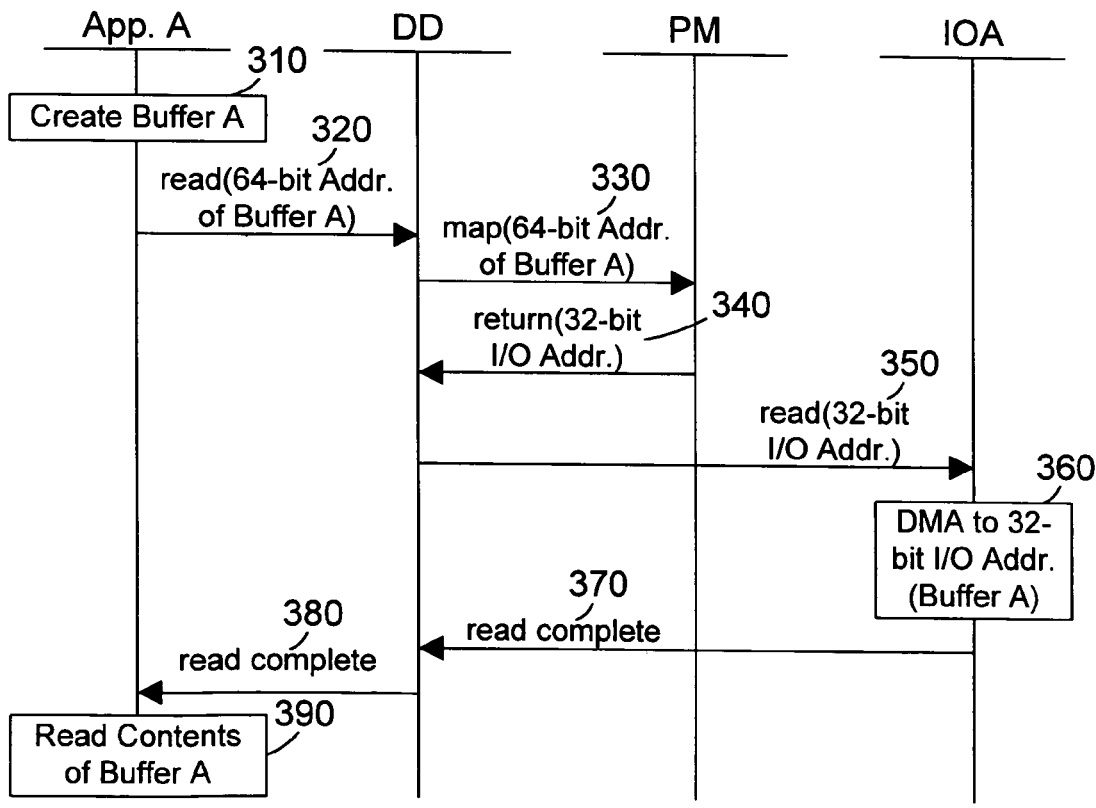
FIG. 3 is an interaction diagram showing steps in the system of FIG. 2 for an application in the hosting partition to read data from the I/O adapter.
Figure 4:
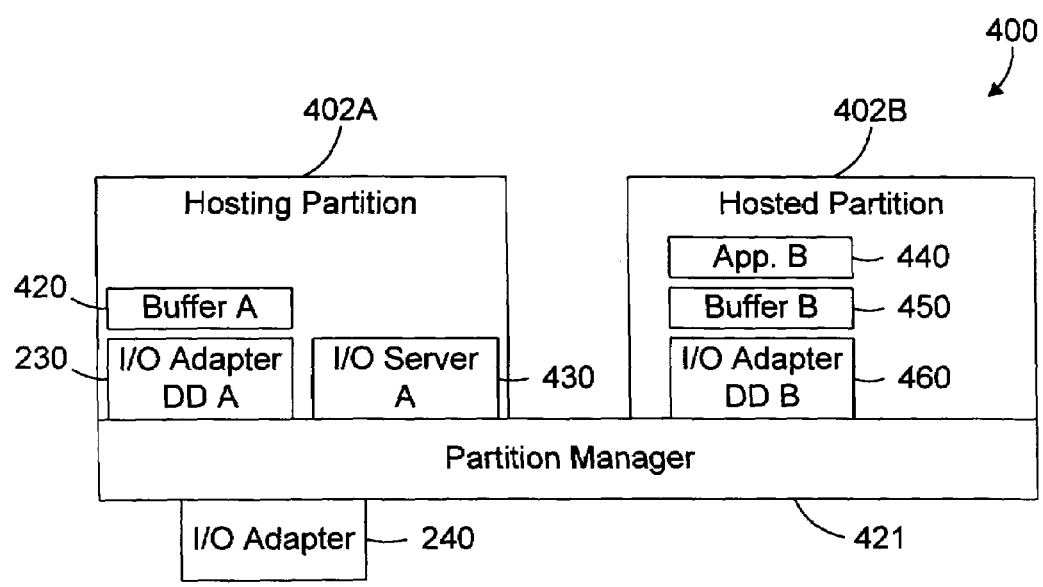
FIG. 4 is a block diagram of a prior art logically partitioned computer system.
Figure 5:
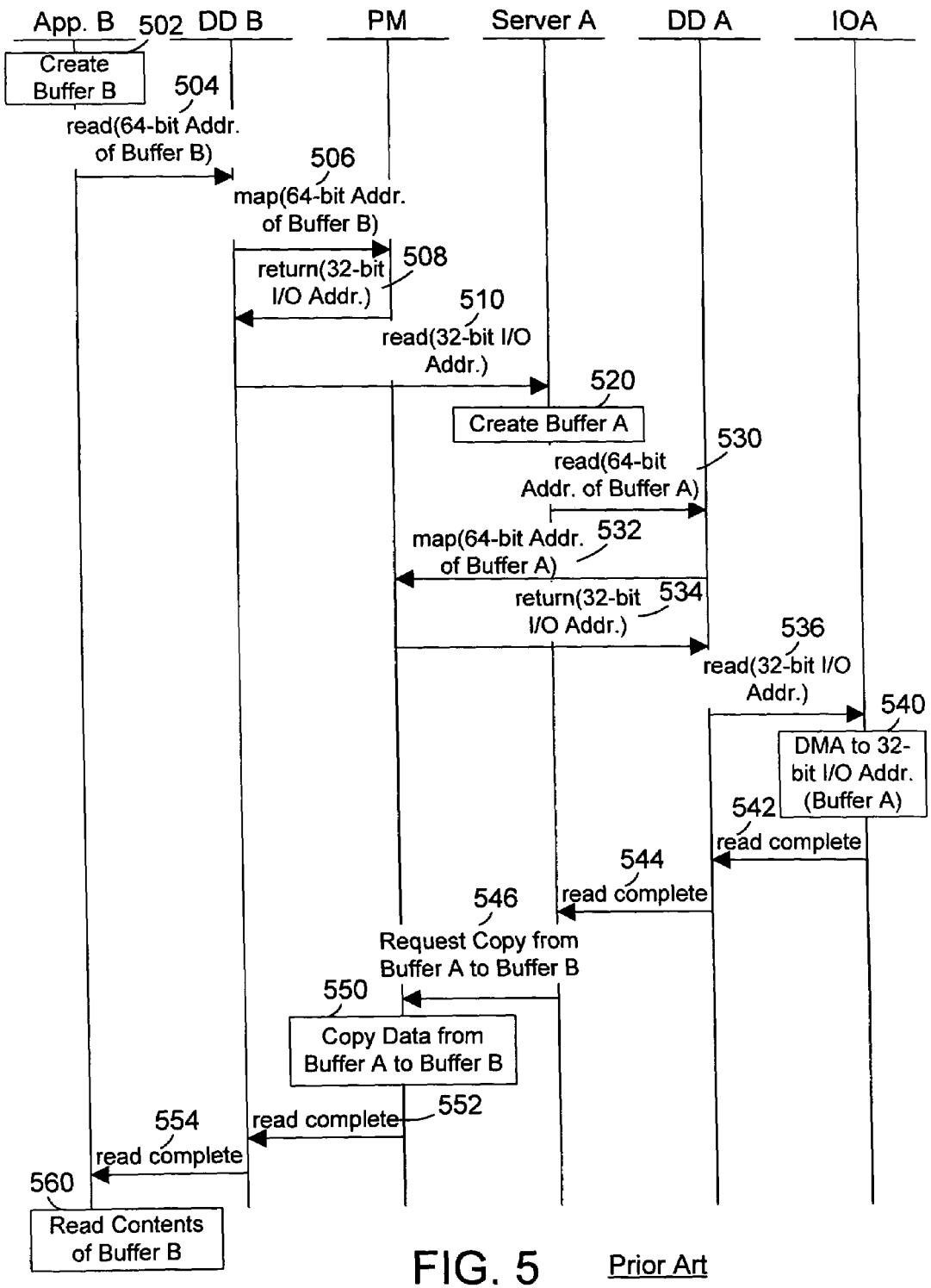
FIG. 5 is an interaction diagram showing steps in the system of FIG. 4 for an application in the hosted partition to read data from the I/O adapter in the hosting partition.

Two different systems in accordance with the prior art are shown in FIGS. 2 and 4, with corresponding interaction diagrams in FIGS. 3 and 5, respectively. Referring now to FIGS. 2 and 3, a prior art system 200 is a logical view showing software components that interact when communicating with an I/O adapter 240, such as a disk storage adapter. Note that the operating systems shown in FIG. 1 within each logical partition are not shown in FIG. 2 for the sake or reducing unnecessary clutter in FIG. 2. Two logical partitions 202A and 202B are shown. We assume for this example that logical partition 202A is the hosting partition that controls (or owns) the I/O adapter 240, while logical partition 202B is a hosted partition that could share the I/O adapter 240. The simple example in FIGS. 2 and 3 shows the steps for performing a direct memory access (DMA) read operation from the I/O adapter 240 to a buffer 220 in the hosting partition 202A. First, we assume that application A 210 desired to read from the I/O adapter 240. Application A 210 creates buffer A 220 (step 310). Application A 210 then performs a read operation on the I/O adapter device driver 230, passing the 64-bit address of buffer A as the target of the read operation (step 320). The device driver 230 then calls a map function on the partition manager 221, passing the 64-bit address of buffer A 220 (step 330). The partition manager looks at its address translation tables for the 64-bit address, and returns a corresponding 32-bit I/O address to the device driver (step 340). The device driver then performs a read operation on the I/O adapter 240, passing the 32-bit I/O address (step 350). The I/O adapter then performs a DMA operation to the 32-bit I/O address, which represents buffer A 220 (step 360). The I/O adapter 240 then signals to the device driver 230 that the read is complete (step 370), which in turn notifies application A 210 that the read is complete (step 380). Application A then reads the contents of buffer A (step 390).

The DMA of information from the I/O adapter 240 into a buffer 220 in the hosting partition 202A is relatively straightforward, as described above in FIGS. 2 and 3. Note, however, that the DMA of information to a hosted partition that shares the I/O adapter as a virtual I/O adapter is more complex, as shown in FIGS. 4 and 5. Referring to FIG. 4, system 400 includes a hosting partition 402A, a hosted partition 402B, a partition manager 421, and an I/O adapter 240. We assume an application B 440 in the hosted partition 402B needs to read information from the I/O adapter 240. To support sharing of the I/O adapter 240 between logical partitions, a virtual device driver 460 is provided on the hosted partition 402B that communicates with an I/O server A 430 in the hosting partition 402A. The I/O server 430 communicates with the I/O adapter device driver 230, which is the actual device driver to the I/O adapter 240. The sequence of operations for application 440 in the hosted partition 402B to read from the shared I/O adapter 240 is shown in FIG. 5.

When application B 440 in the hosted partition 402B wants to read data from the I/O adapter 240, application B 440 first creates a local buffer B 450 (step 502). Application B 440 then performs a read operation to the virtual device driver 460 in the hosted partition 402B, passing the 64-bit address of buffer B 450 as the target of the read operation (step 504). The virtual device driver then calls a map function in the partition manager 421, passing the 64-bit address of buffer B 450 (step 506). In response, the partition manager 421 looks at its address translation tables for the 64-bit address of buffer B 450, and returns a corresponding 32-bit I/O address (step 508). The virtual device driver 460 then performs a read operation to I/O server A 430, passing the 32-bit I/O address of buffer B 450 as the target of the read operation (step 510). In response, the I/O server 430 creates buffer A 420 in the hosting partition (step 520). The I/O server 430 then performs a read operation to the device driver 230 in the hosting partition 402A, passing the 64-bit address of buffer A 420 (step 530). In response, the device driver 230 calls a map function in the partition manager 421, passing the 64-bit address of buffer A 420 (step 532). The partition manager looks at its address translation tables for the 64-bit address of buffer A 420, and returns a corresponding 32-bit I/O address (step 534). The device driver 230 then performs a read operation on the I/O adapter 240, passing the 32-bit I/O address (step 536). In response, the I/O adapter performs a DMA operation to the 32-bit I/O address that corresponds to buffer A 420 in the hosting partition 402A (step 540). Once the DMA operation is complete, the I/O adapter 240 signals to the device driver 230 that the read is complete (step 542), which, in turn, notifies the I/O server A 430 that the read is complete (step 544). The I/O server A 430 then makes a request to the partition manager 421 to copy the contents of buffer 420 in the hosting partition 402A to buffer 450 in the hosted partition 402B (step 546). In response, the partition manager copies the data from buffer A 420 to buffer B 450 (step 550). The partition manager then signals to the virtual device driver 460 in the hosted partition 402B that the read is complete (step 552), which then signals to the application 440 that the read is complete (step 554). The application 440 then reads the contents of buffer 450 (step 560).

One of the significant disadvantages of the prior art system and method shown in FIGS. 4 and 5 is that data cannot be transferred directly from the I/O adapter 240 to buffer 450 in the hosted partition. The reason this is not possible in the prior art is that the device driver 230 to the I/O adapter 240 expects only 64-bit addresses. Note, however, that the 64-bit address of buffer B 450 is not known by the hosting partition 402A, because the 32-bit I/O address of buffer B 450 is passed to the I/O server 430 as the destination of the read. As a result, a buffer 420 in the hosting partition 402A must be created, and the 64-bit address of the buffer 420 may then be passed to the device driver 230. Note, however, that this results in performing a DMA operation to transfer the data from the I/O adapter to buffer A 420, followed by a copy by the partition manager 421 from buffer A 420 to buffer B 450. This copy of data significantly affects the performance of system 400 when hosted partition 402B shares the I/O adapter 240 that is owned by the hosting partition 402A.

One way to solve this problem and allow the I/O adapter 240 to directly transfer data to the buffer 450 in the hosted partition 402B is to modify the device driver 230 so that it can accept both 32-bit I/O addresses and 64-bit memory addresses as the target of a read operation. The problem with this approach is that device drivers are numerous and are typically provided by companies that supply the I/O adapter 240. Mandating that all suppliers of I/O adapters modify their device drivers to accept both 32-bit I/O addresses and 64-bit memory addresses as the target of a read operation is not an acceptable solution. What is needed is a way to perform redirected DMA operations (with a target 32-bit I/O address instead of a 64-bit memory address) in a way that does not affect the device driver 230 for the I/O adapter 240. The preferred embodiments provide just such a solution, one that works around the limitations of the device driver 230 in a way that allows redirected DMA operations directly from the I/O adapter 240 to a 32-bit I/O address.

Note that the term "DMA operation" as used herein denotes an operation where an I/O adapter transfers data to a 32-bit I/O address. The use of 32-bit I/O addresses is common even in system that have greater than 32-bits of addressing due to I/O bus architecture, such as the PCI bus that is common and known in the art. In a normal DMA operation, the 32-bit I/O address represents a 64-bit memory address in the hosting partition. In a redirected DMA operation, the 32-bit I/O address represents a 64-bit memory address in a hosted partition. Redirected DMA operations are not possible using prior art device drivers because the prior art device drivers require a 64-bit memory address to be passed as the target of the read operation. In a redirected DMA operation, only a 32-bit I/O address is known, so there is no corresponding 64-bit memory address that can be passed to the device driver. As a result, redirected DMA operations are not possible in the prior art, and instead the data must be read into the hosting partition, then copied to the hosted partition, as shown in FIGS. 3 and 4 and explained in detail above.

The preferred embodiments provide a way to perform redirected DMA operations without modifying the device driver that interacts with the I/O adapter. A memory tag mechanism creates a 64-bit memory tag that corresponds to a 32-bit I/O address. The memory tag is an identifier, does not represent physical memory, and is therefore sometimes referred to herein as a "logical" memory tag. The 64-bit memory tag may be passed to the device driver, which assumes the memory tag is a valid memory address. However, when the device driver queries the partition manager to determine a 32-bit I/O address that corresponds to the 64-bit memory tag, the partition manager will detect that the 64-bit address is a memory tag, will look up the 64-bit memory tag in the memory tag table, and will return the 32-bit I/O address that corresponds to the 64-bit memory tag. The memory tag of the preferred embodiments thus provides a way to bypass the limitations of the device driver and use a 32-bit I/O address as the target of a DMA operation.

Figure 6:
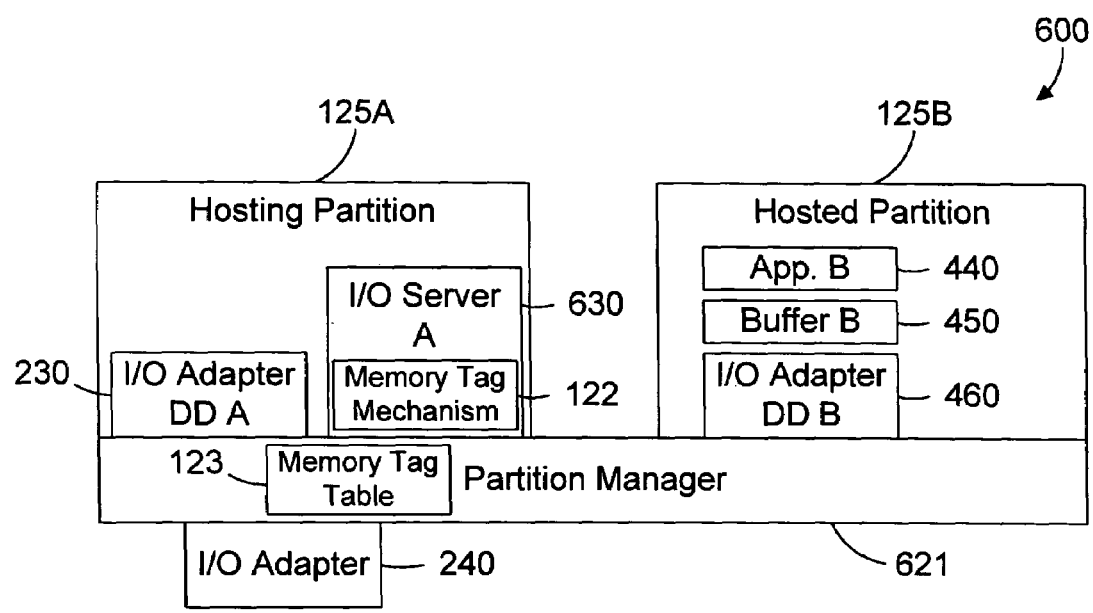
FIG. 6 is a block diagram of a logically partitioned computer system that uses memory tags in accordance with the preferred embodiments when performing redirected DMA operations.

Referring now to FIG. 6, a system 600 in accordance with the preferred embodiments includes a hosting partition 125A, a hosted partition 125B, a partition manager 621, and an I/O adapter 240. The hosting partition 125A owns (or controls) the I/O adapter 240, while the hosted partition 125B shares the I/O adapter 240. The hosting partition 125A includes an I/O adapter device driver 230 that interacts with and controls the I/O adapter 240. The hosting partition 125A also includes an I/O server A 630 that preferably includes the memory tag mechanism 122. The hosted partition 125B includes an application B 440, a buffer B 450, and a virtual device driver 460 for the I/O adapter 240. When a request is made to the virtual device driver 460, a corresponding request is made to the I/O server A 630, which then interacts with the device driver 230 to perform the action requested by the virtual device driver 460.

Figure 7:
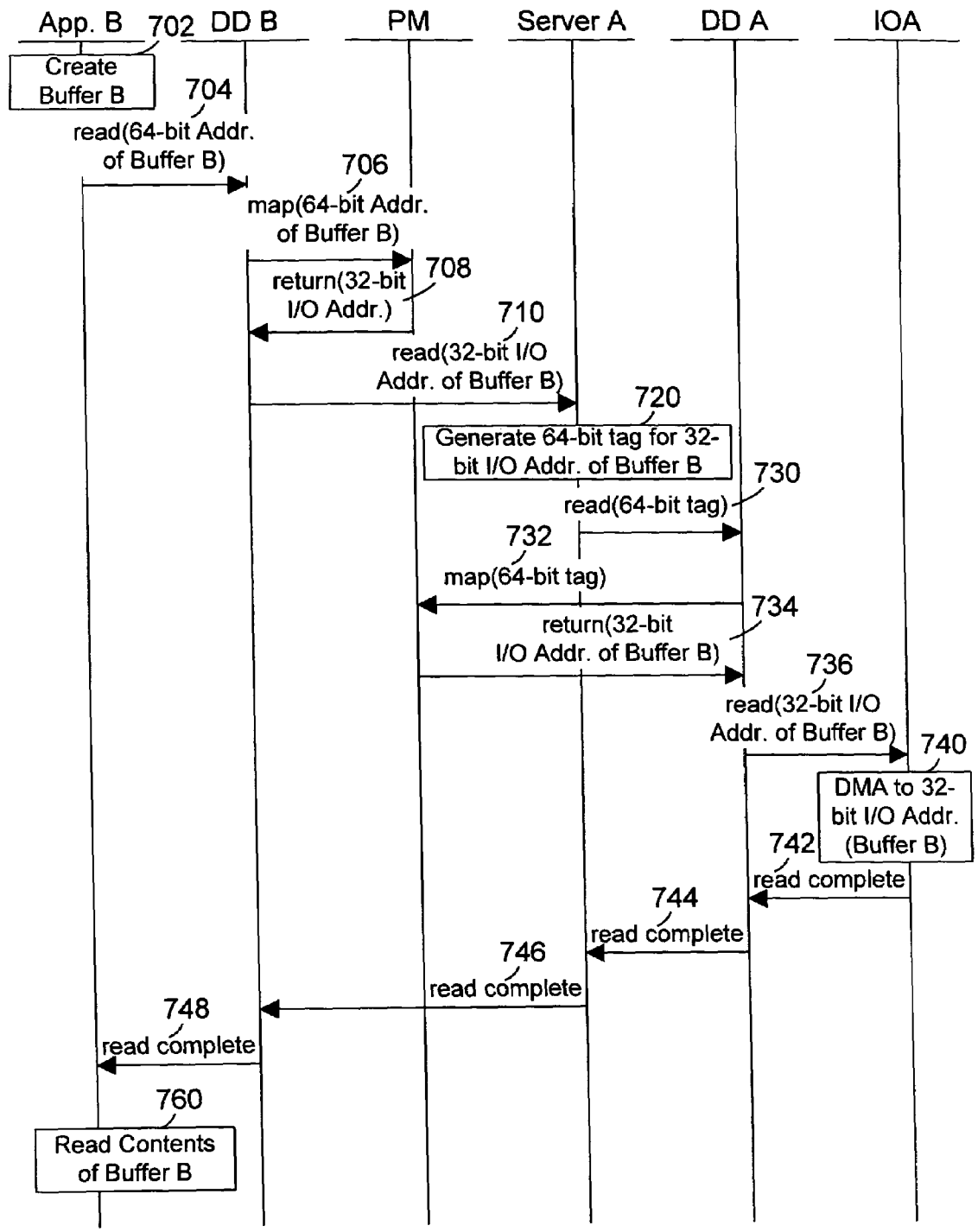
FIG. 7 is an interaction diagram showing steps in the system of FIG. 6 in accordance with the preferred embodiments for an application in the hosted partition to receive data from the shared I/O adapter in the hosting partition via a redirected DMA operation.
Figure 8:
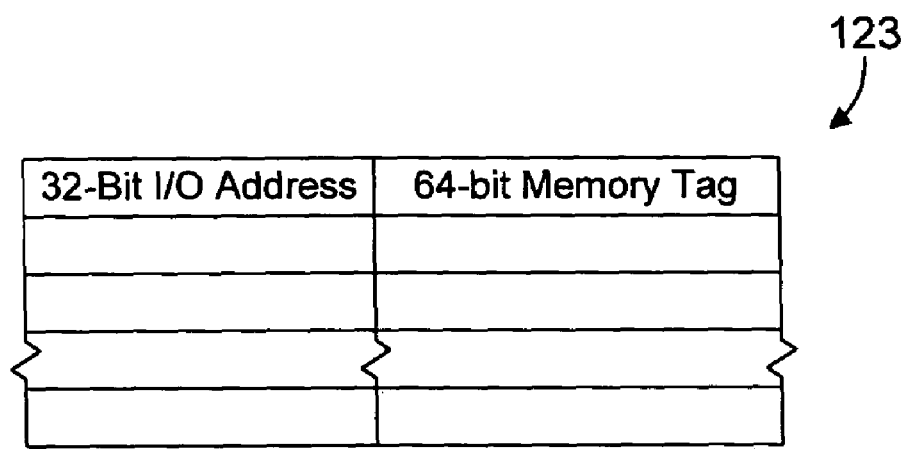
FIG. 8 is a block diagram showing a memory tag table that correlates I/O addresses to their corresponding memory tags in accordance with the preferred embodiments.

We now look at FIG. 7, which shows an interaction diagram for one specific redirected DMA operation in accordance with the preferred embodiments. We assume that application B 440 in the hosted partition 125B needs to read information from the shared I/O adapter 240. First, application B 440 creates a buffer B 450 to receive the data (step 702). Next, application B 440 performs a read operation on the virtual device driver 460, passing the 64-bit address of buffer B 450 (step 704). The device driver 460 then invokes a map function of the partition manager 621, passing the 64-bit memory address of buffer B 450 (step 706). In response, the partition manager 621 generates from the 64-bit memory address of buffer B 450 a corresponding 32-bit I/O address, and returns the 32-bit I/O address for buffer B 450 to the virtual device driver 460 (step 708). The virtual device driver 460 then performs a read operation on the I/O server 630, passing the 32-bit I/O address of buffer B 450 (step 710). When the I/O server 630 recognizes that the target of the read operation is a 32-bit I/O address, the I/O server 630 generates a 64-bit memory tag that corresponds to the 32-bit I/O address of buffer B 450 (step 720). Note that this 64-bit memory tag is simply an identifier, and does not represent physical memory. This 64-bit memory tag and its associated 32-bit I/O address are stored as a tuple in the memory tag table 123, shown in FIG. 1 and shown in more detail in FIG. 8. The 64-bit memory tag is then passed as the target when the I/O server 630 performs a read operation to the device driver 230 (step 730). The device driver 230 assumes that the 64-bit memory tag is a valid memory address. The device driver then passes the 64 bit memory tag to the partition manager 621 to determine a corresponding 32-bit I/O address (step 732). The partition manager 621 detects that the 64-bit address is a memory tag, and in response, performs a table lookup on the memory tag table 123, and returns the 32-bit I/O address corresponding to the memory tag (step 734). In the preferred embodiments, memory tags are assigned a specific range of the 64-bit address space that does not represent physical memory. The partition manager 621 preferably detects whether or not the 64-bit address passed to it is a memory tag by determining whether the address lies within a range of addresses that is defined for memory tags.

Note that memory tag table 123 is shown in FIG. 6 as residing within the partition manager 621. However, the memory tag table 123 could instead be located within the I/O server A 630, or elsewhere within the hosting partition 125A.

Next, the device driver 230 performs a read operation on the I/O adapter 240, passing the 32-bit I/O address of buffer B 450 as the target address of the read operation (step 736). In response, the I/O adapter 240 performs a DMA operation to the 32-bit I/O address of buffer B 450 (step 740), which results in data be directly transferred from the I/O adapter 240 in FIG. 6 to buffer B 450 in the hosted partition 125B. Once the read is complete, the I/O adapter 240 sends a message to the device driver 230 that the read is complete (step 742), which sends a read complete message to the I/O server A 630 (step 744), which sends a read complete message to the virtual device driver 460 (step 746), which sends a read complete message to application B 440 (step 748). Application B 440 then reads the contents of buffer B 450 (step 760).

A significant aspect of the preferred embodiments is that the creation and use of 64-bit memory tags allows performing redirected DMA operations without modifying existing device drivers or I/O adapters. This can be seen by analyzing steps 530, 532, 534 and 536 of FIG. 5 and comparing these steps to steps 730, 732, 734 and 736 of FIG. 7. In FIG. 5, a 64-bit address is passed to the device driver, and the partition manager returns a corresponding 32-bit I/O address to the device driver. The 32-bit I/O address is then specified as a target to the read operation to the I/O adapter in step 536. In FIG. 7, a 64-bit memory tag is passed to the device driver, and the partition manager returns the 32-bit I/O address that corresponds to the memory tag. The 32-bit I/O address is then specified as the target to the read operation to the I/O adapter in step 736. In both cases, the function of the device driver is the same: receive a 64-bit parameter, pass the 64-bit parameter to the partition manager, receive from the partition manager a corresponding 32-bit I/O address, then perform a read operation to the 32-bit I/O address. In the prior art case, the 64-bit address passed in step 530 is the address of the buffer 420 in the hosting partition, and the partition manager determines from its address translation tables the corresponding I/O address. In the case of redirected DMA shown in FIG. 7, the 64-bit address passed in step 730 is the 64-bit memory tag. Note that the device driver cannot tell the difference between a real memory address and a memory tag. As a result, the device driver performs the same functions. It invokes a map function on the partition manager, passing the 64-bit memory tag (step 732). The partition manager recognizes the 64-bit address as a memory tag, and instead of going to its address translation tables to retrieve a corresponding 32-bit I/O address, the partition manager instead retrieves from the memory tag table the 32-bit I/O address that corresponds to the 64-bit memory tag.

One significant feature provided by the use of memory tags is that the function of the device driver and I/O adapter do not change. For this reason the I/O adapter device driver 230 and I/O adapter 240 in FIG. 6 are shown with the same numerical designators in FIGS. 2 and 4. The device driver 230 cannot tell the difference between a valid 64-bit address that represents physical memory and a 64-bit memory tag, so its operations do not change. In addition, the fact that DMA operations from the I/O adapter 240 now target a buffer 450 in the hosted partition 125B is irrelevant to the I/O adapter 240. It simply performs a DMA read operation and puts the data at the 32-bit I/O address specified in the read command. The memory tags of the preferred embodiments thus provide a simple yet elegant way to use existing device drivers and existing I/O adapters to perform redirected DMA operations.

The preferred embodiments provide a significant advance over the prior art by allowing redirected DMA operations in a logically partitioned computer system. Redirected DMA operations allow writing data directly from the shared I/O adapter to memory within a logical partition that shares the I/O adapter. Because the data may be directly transferred to the logical partition that shares the I/O adapter, instead of copying data from the logical partition that owns the I/O adapter to the logical partition that shares the I/O adapter, the result is a significant improvement in system performance when sharing an I/O adapter between logical partitions.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention. For example, while 64-bit memory addresses and 32-bit I/O addresses are referenced herein, they are shown as examples of different sized addresses. The memory tag mechanism may be used whenever there is a mismatch of size between addresses in a computer system, regardless of the actual size of the addresses.

What is claimed is:

1. An apparatus comprising:
at least one processor;
a memory coupled to the at least one processor;
a partition manager residing in the memory and executed by the at least one processor, the partition manager managing allocation of a plurality of hardware resources to a plurality of logical partitions and managing communication between the plurality of logical partitions;
an I/O adapter coupled to the at least one processor;
a device driver for the I/O adapter, the device driver including an interface for performing an I/O operation on a first address of a first length by the I/O adapter, the device driver making a call to the partition manager passing the address of the first length to retrieve a corresponding address of a second length, wherein the first length is different than the second length; and
a memory tag mechanism that creates a memory tag of the first length that corresponds to a second address of the second length, wherein the memory tag comprises an identifier that cannot be mapped to a corresponding location in physical memory;
wherein the partition manager, when the device driver makes the call to the partition manager passing the first address of the first length to retrieve the corresponding address of the second length, detects when the first address is a memory tag by determining that the first address is in a predefined range of addresses, and if so, returns the second address of the second length that corresponds to the memory tag.

2. The apparatus of claim 1 wherein the partition manager detects when the first address is a memory tag by determining that the first address is in a predefined range of addresses.

3. The apparatus of claim 1 wherein an address of the second length may be used to initiate a redirected direct memory access operation by the memory tag mechanism creating a memory tag of the first length that corresponds to the address of the second length and passing the corresponding memory tag to the device driver.

4. The apparatus of claim 1 wherein the first length is 64 bits and the second length is 32 bits.

5. A computer-implemented method for a first logical partition to access an I/O adapter allocated to a second logical partition, the method comprising the steps of:
(A) creating a memory tag of a first length that corresponds to a second address of a second length, wherein the first length is different than the second length, wherein the memory tag comprises an identifier that cannot be mapped to a corresponding location in physical memory;
(B) passing the memory tag to a device driver for the I/O adapter;
(C) the device driver passing the memory tag to a partition manager to determine the second address of the second length that corresponds to the memory tag, wherein the partition manager manages allocation of a plurality of hardware resources to the first and second logical partitions and manages communication between the first and second logical partitions;
(D) the partition manager detecting the memory tag by determining that the memory tag is in a predefined range of addresses and returning to the device driver the second address of the second length that corresponds to the memory tag; and
(E) the device driver accessing the I/O adapter using the second address of the second length that corresponds to the memory tag.

6. The method of claim 5 further comprising the step of the I/O adapter performing a direct memory access (DMA) operation at a location specified by the second address.

7. The method of claim 6 wherein the DMA operation comprises a redirected DMA operation.

8. The method of claim 5 wherein step (D) comprises the step of the partition manager detecting when the first address is a memory tag.

9. The method of claim 5 wherein an address of the second length may be used to initiate a redirected direct memory access operation by creating a memory tag of the first length that corresponds to the address of the second length and passing the corresponding memory tag to the device driver.

10. The method of claim 5 wherein the first length is 64 bits and the second length is 32 bits.

11. A computer readable program product comprising:
(A) a memory tag mechanism that creates a memory tag of a first length that corresponds to a second address of a second length, wherein the first length is different than the second length, wherein the memory tag comprises an identifier that cannot be mapped to a corresponding location in physical memory, the memory tag being passed to a device driver for an I/O adapter, the device driver including an interface for performing an I/O operation on a first address of a first length by the I/O adapter, the device driver making a call to a partition manager passing the address of the first length to retrieve a corresponding address of a second length, the partition manager managing allocation of a plurality of hardware resources to a plurality of logical partitions and managing communication between the plurality of logical partitions, wherein the partition manager detects when the first address is a memory tag by determining that the first address is in a predefined range of addresses, and if so, returns the second address of the second length that corresponds to the memory tag; and
(B) recordable media bearing the memory tag mechanism.

12. The program product of claim 11 wherein an address of the second length may be used to initiate a redirected direct memory access operation by the memory tag mechanism creating a memory tag of the first length that corresponds to the address of the second length and passing the corresponding memory tag to the device driver.

13. The program product of claim 11 wherein the first length is 64 bits and the second length is 32 bits.

14. An apparatus comprising:
at least one processor;
a memory coupled to the at least one processor;
a partition manager residing in the memory and executed by the at least one processor, the partition manager managing communication between first and second logical partitions;
an I/O adapter coupled to the at least one processor and allocated to the first logical partition;
a first device driver for the I/O adapter residing in the first logical partition;
a memory tag mechanism residing in the first logical partition that creates a memory tag of a first length that corresponds to a second address of a second length, wherein the first length is different than the second length, wherein the memory tag comprises an identifier that cannot be mapped to a corresponding location in physical memory;
a second device driver for the I/O adapter residing in the second logical partition;
an application residing in the second logical partition that creates a buffer for receiving data from the I/O adapter, the application performing a read operation to the second device driver passing an address of the buffer;
in response to the read operation from the application, the second device driver makes a call to the partition manager passing the address of the buffer, and in response thereto, the partition manager returning a corresponding I/O address for the buffer;

the second device driver passing the I/O address for the buffer to the memory tag mechanism, which generates therefrom a corresponding memory tag for the buffer that cannot be mapped to a corresponding location in physical memory;

the memory tag mechanism making a call to the first device driver, passing the memory tag for the buffer;

the first device driver, in response to the call by the memory tag mechanism, making a call to the partition manager, passing the memory tag for the buffer;

the partition manager returning to the first device driver the I/O address of the buffer;

the first device driver performing a read from the I/O adapter, passing the I/O address of the buffer as a target location for the read; and writing via direct memory access from the I/O adapter to the I/O address of the buffer.

15. A method for performing a direct memory access operation from an I/O adapter in a first logical partition to an application in a second logical partition, the method comprising the steps of:

the application creating a buffer for receiving data from the I/O adapter;

the application performing a read operation to a second device driver in the second logical partition, passing an address of the buffer;

in response to the read operation from the application, the second device driver making a call to a partition manager passing the address of the buffer;

in response to the call from the second device driver, the partition manager returning a corresponding I/O address for the buffer, wherein the address of the buffer and the corresponding I/O address of the buffer are of different lengths;

the second device driver passing the I/O address for the buffer to a memory tag mechanism, which generates therefrom a corresponding memory tag for the buffer that cannot be mapped to a corresponding location in physical memory;

the memory tag mechanism making a call to the a device driver, passing the memory tag for the buffer;

the first device driver, in response to the call by the memory tag mechanism, making a call to the partition manager, passing the memory tag for the buffer;

the partition manager, in response to the call by the first device driver, returning to the first device driver the I/O address of the buffer;

the first device driver performing a read from the I/O adapter, passing the I/O address of the buffer as a target location for the read; and writing via direct memory access from the I/O adapter to the I/O address of the buffer.

16. A computer readable program product comprising:

(A) a memory tag mechanism that creates a memory tag of a first length that corresponds to a second address of a second length, wherein the first length is different than the second length, wherein the memory tag comprises an identifier that cannot be mapped to a corresponding location in physical memory, wherein an application residing in a second logical partition creates a buffer for receiving data from an I/O adapter residing in a first logical partition, the application performing a read operation to a second device driver residing in the second logical partition passing an address of the buffer, and in response to the read operation from the application, the second device driver makes a call to a partition manager passing the address of the buffer, and in response thereto, the partition manager returns a corresponding I/O address for the buffer, the second device driver passing the I/O address for the buffer to the memory tag mechanism in the first logical partition, the memory tag mechanism generating from the I/O address for the buffer a corresponding memory tag for the buffer that cannot be mapped to a corresponding location in physical memory, the memory tag mechanism making a call to a first device driver in the first logical partition passing the memory tag for the buffer, the first device driver, in response to the call by the memory tag mechanism, making a call to the partition manager, passing the memory tag for the buffer, the partition manager returning to the first device driver the I/O address of the buffer, the first device driver performing a read from the I/O adapter, passing the I/O address of the buffer as a target location for the read, and writing via direct memory access from the I/O adapter to the I/O address of the buffer; and (B) recordable media bearing the memory tag mechanism.

* * * * *